(12) United States Patent
Cerruti (10) Patent No.: US 7,347,005 B2
(45) Date of Patent: Mar. 25, 2008

(54) VENTILATION SYSTEM FOR HOUSEHOLD APPLIANCES IN PARTICULAR FOR WASHING MACHINES

(75) Inventor: Daniele Cerruti, Fontanetto Po VC (IT)

(73) Assignee: Eltek, S.p.A., Casale Monferrato (IT)

( * ) Notice: Subject to any disclaimer, the term of this patent is extended or adjusted under 35 U.S.C. 154(b) by 581 days.

(21) Appl. No.: 10/471,321

(22) PCT Filed: Mar. 19, 2002

(86) PCT No.: PCT/IB02/00804

§ 371 (c)(1),
(2), (4) Date: Oct. 17, 2003

(87) PCT Pub. No.: WO02/074154

PCT Pub. Date: Sep. 26, 2002

(65) Prior Publication Data

US 2004/0080219 A1 Apr. 29, 2004

(30) Foreign Application Priority Data

Mar. 20, 2001 (IT) .............................. TO01A0262

(51) Int. Cl.
*F26B 25/06* (2006.01)

(52) U.S. Cl. ....................................... 34/235; 134/95.2

(58) Field of Classification Search ................. 34/604, 34/80, 90, 235; 134/57 D
See application file for complete search history.

(56) References Cited

U.S. PATENT DOCUMENTS

| 4,754,770 | A | * | 7/1988 | Fornasari ................... 134/57 D |
| 5,660,195 | A | * | 8/1997 | Taylor et al. .............. 134/58 D |
| 5,927,400 | A | * | 7/1999 | Bononi et al. ............... 165/295 |
| 7,047,987 | B2 | * | 5/2006 | Cerruti et al. ............ 134/58 D |

* cited by examiner

*Primary Examiner*—S. Gravini
(74) *Attorney, Agent, or Firm*—Levine & Mandelbaum (57) ABSTRACT

Ventilation system for household appliances, in particular for washing machines, including a device having at least a chamber for housing an impeller, a suction duct, through which a first fluid, in particular damp air, is sucked into the chamber by the impeller, an ejection duct, through which the first fluid sucked into the chamber is expelled from it by the impeller, a first movable shuttering for obstructing the suction duct at least partially, the first shutter being movable at least partially inside the suction duct, and a first actuator for producing the motion of the first shutter. According to the invention, after operation of the first actuator the first shutter is capable of performing movements having at least a linear component, the linear component extending in the same axial direction of the suction duct.

45 Claims, 7 Drawing Sheets

VENTILATION SYSTEM FOR HOUSEHOLD APPLIANCES IN PARTICULAR FOR WASHING MACHINES

BACKGROUND OF THE INVENTION

The present invention refers to a ventilation system for household appliances, in particular washing machines.

As known, some household appliances, in particular various types of washing machines, are equipped with a ventilation system based on the-use of a blower or fan; typically, these systems are assembled on those dishwashing machines with a final drying step for the crockery and pots at the end of the washing, favoured by air forced ventilation inside the washing tub.

The action of the above fan is intended for improving removal of the steam produced inside the washing tub and obtain an improved drying than obtained by more conventional solutions (such as leaving the crockery inside the machine for a few minutes, during which the steam is partially removed through a "condensing effect" exerted by the tub walls, and causing the steam to be partially expelled through appropriate venting outlets).

Common dishwashing machines fitted with forced drying systems have the fan usually located inside the door or in the gap formed between one of the tub side walls and the corresponding wall of the machine outer cabinet; as a result, the fans used to this purpose should have very small dimensions or anyway a flattened form, though providing good air outlet sections.

Some known solutions have the fan fitted with a shutter operating on the fan suction duct from the tub, which is apt to isolate the former from the latter to avoid water inlet during the wash steps; at wash end, this shutter is actuated to open the above suction duct, the fan is started and both the dampness and steam can be sucked outside the tub and either condensed or expelled in the environment outside.

The movable shutter employed in the above systems usually is in the form of a half disk or disk with appropriate slits, which is swivelling or angularly movable for opening the fan suction duct.

Examples of this shuttering means are described in EP-A-0 521 815 and GB-A-2.274.772.

This shutter configuration as a disk or half disk has some drawbacks.

A first drawback is the hydraulic sealing between the shutter and the suction duct being poorly reliable, due to the lack of gaskets between these parts. Theoretically, special gaskets may be provided on the shutter or suction duct for sealing improvement, but in this case the system would necessarily require a significant actuation force to produce the angular or rotating movement of the shutter; this is due to the need of overcoming the frictions caused by the shutter sliding on the sealing gaskets of the suction duct or by the frictions caused by the sealing gaskets of the shutter sliding on the surfaces of the suction duct.

Besides originating the above frictions, such sliding may also lead to a high wear of the gaskets with time.

Shutters according to common art have a poor efficiency from a standpoint of fluid mechanics; this drawback is due to the form of common shutters, which are substantially in the form of a disk, i.e. with a flattened shape causing a certain resistance to air circulation.

Additionally, shuttering means according to common art do not provide for a complete opening of the fan suction duct, due to their configuration like a half disk or disk with slits; it is actually clear, that in case of half-disk shutters the air outlet section will be at the most equal that of the half disk, whereas in the instance of disk shutters with slits, the air outlet section will be at the most equal than of the slits.

SUMMARY OF THE INVENTION

It is the object of the present invention to solve the drawbacks of the ventilation systems of known washing machines.

In this frame, a first aim of the invention is to provide a ventilation system comprising shuttering means of a suction duct, which has reliable sealing means, in particular not subject to wear caused by friction or rubbing.

A second aim of the invention is to provide a ventilation system, wherein a moderate actuation force is enough to cause a displacement of the shuttering means of a suction duct, but ensuring said sealing when closed.

A third aim of the invention is to provide a ventilation system, wherein the shuttering means of a suction duct are efficiently shaped from a fluid mechanics standpoint and favouring air circulation.

A fourth aim of the invention is to provide a ventilation system comprising shuttering means of a suction duct, which ensure complete opening of the latter, if required.

In order to achieve one or more of such aims, as well as other aims to become more apparent later, it is the main object of the present invention to provide a ventilation system for household appliances, in particular washing machines, incorporating the features of the annexed claims, which form an integral part of the description herein.

Further objects, features and advantages of the present invention will become apparent from the following detailed description and annexed drawings, which are supplied by way of non limiting example, wherein:

DESCRIPTION OF THE PREFERRED EMBODIMENT

In the above figures, reference 1 indicates a ventilation device as a whole pertaining to the system according to the present invention.

Figure 1:
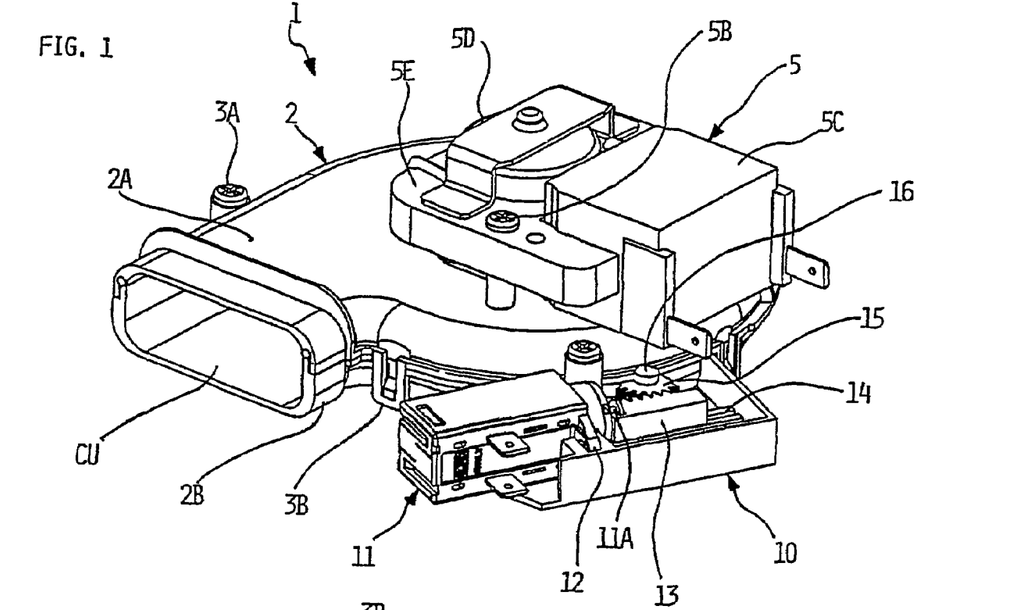
FIG. 1 shows a first perspective view of a ventilation device pertaining to the system according to the invention.
Figure 2:
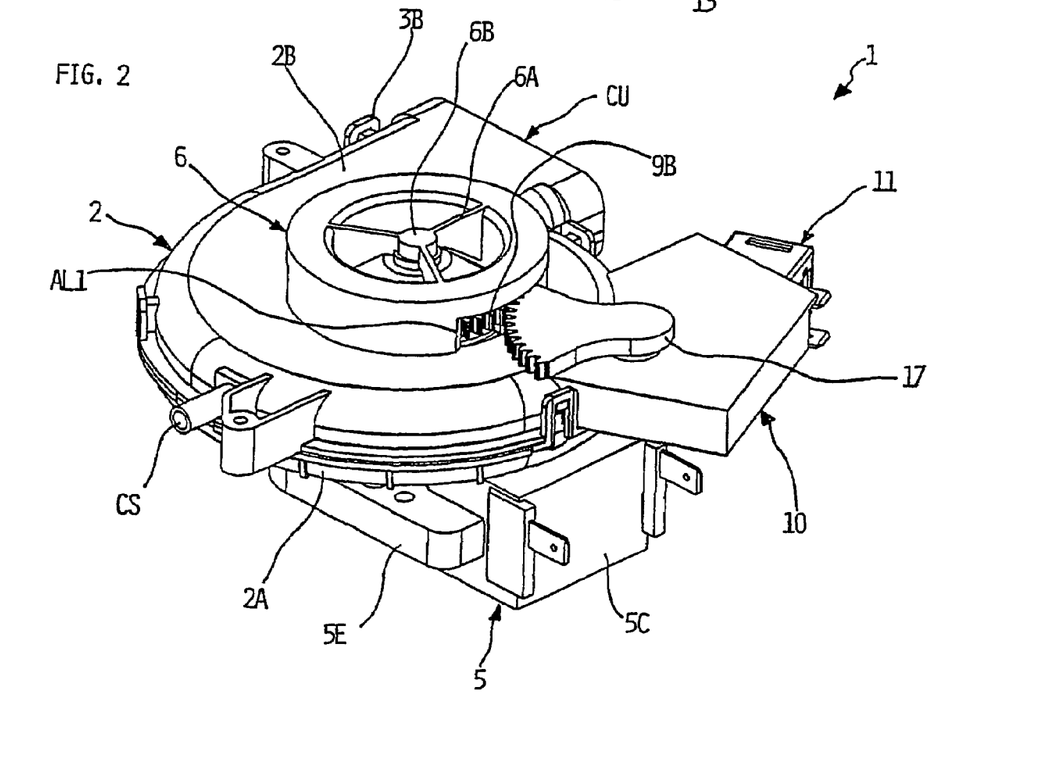
FIG. 2 shows a second perspective view of a ventilation device pertaining to the system according to the invention, in an upturned position compared to the position of FIG. 1.

The device 1 comprises a scroll or volute 2 formed by two half shells 2A and 2B, which are made e.g. from thermoplastic material; both half shells 2A and 2B are commonly coupled to each other, such as by means of screws 3A and/or mutually hooking means 3B, for defining a chamber for housing an impeller; both the chamber and impeller are indicated with CG (FIGS. 5-6) and 4 (FIGS. 3, 6 and 7), respectively; the coupling of the two half shells 2A and 2B also forms an outlet duct of the device 1, indicated with CU in the FIGS. 1 and 2.

Figure 3:
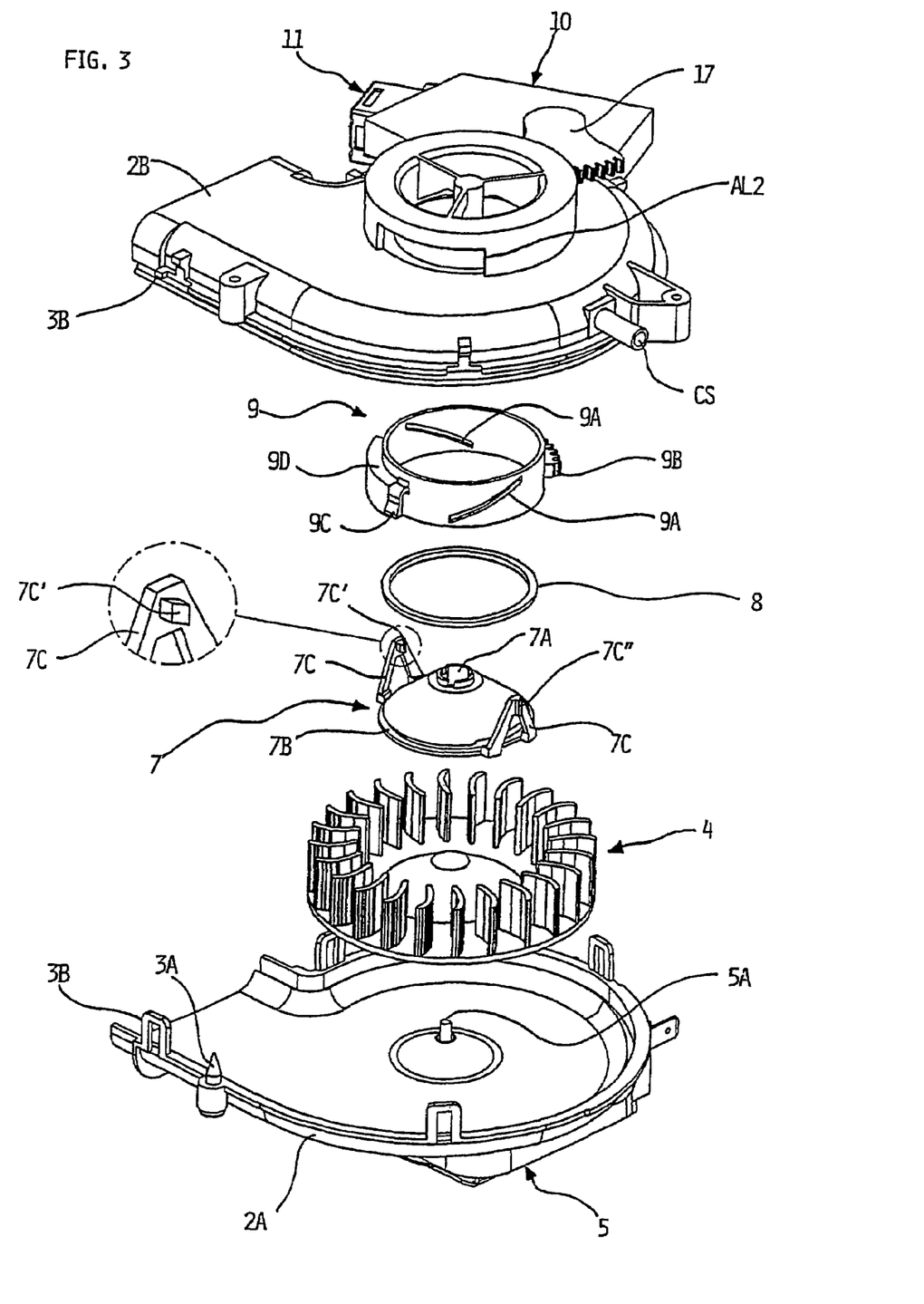
FIG. 3 shows an exploded view of the ventilation device of FIGS. 1 and 2.
Figure 6:
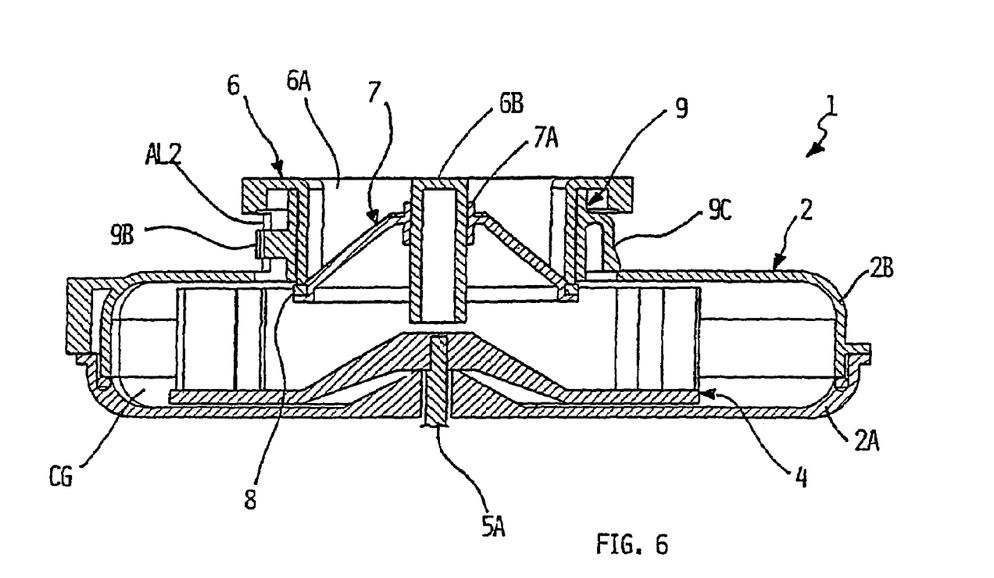
FIGS. 6 and 7 show some sections of the ventilation device of FIGS. 1 and 2, in two different operating conditions.
Figure 7:
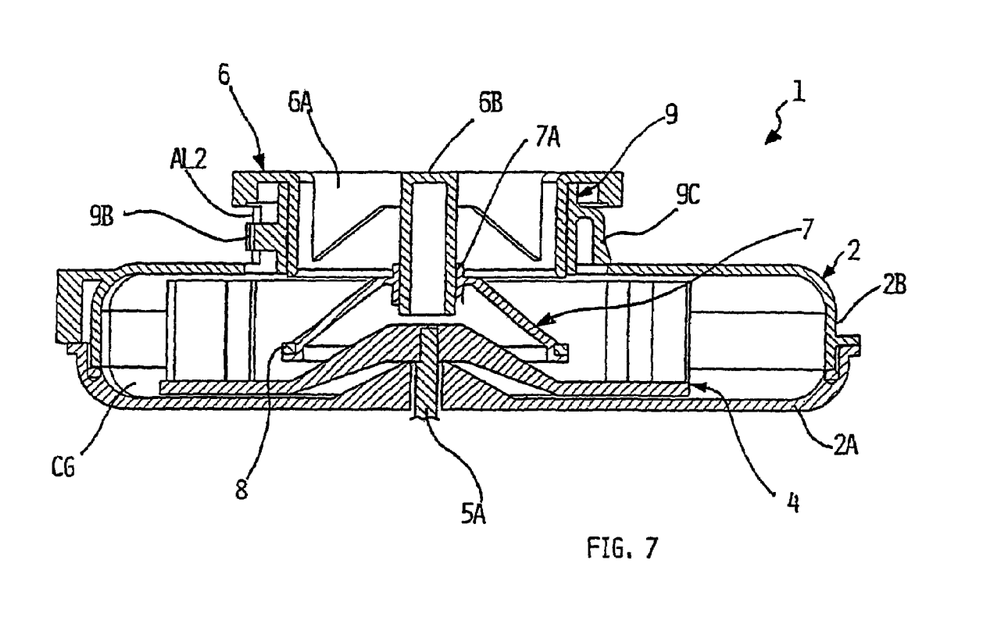

Reference 5 indicates a common electric motor fitted with a shaft 5A, as illustrated in the FIGS. 3, 6 and 7; the motor 5 is commonly coupled to the half shells 2A, e.g. by means of screws 5B, such to let the free end of the shaft 5A enter the chamber CG through a suitable port and be keyed to the impeller 4.

In the example, the motor 5 has a particular flattened form, where the stator winding 5C is abreast to the rotor 5D, both the rotor and stator cooperating by means of a special magnetic yoke 5E; such motors are used for instance in some discharge pumps for washing machines.

The half shell 2B has a tubular duct 6 for obtaining the suction duct of the device 1; in the central path of the duct 6 are delimited septs or ribs 6A, which depart in a radial direction from a central pin 6B; as it can be particularly noticed in the FIGS. 6 and 7, the lower edge of the above septs 6A has an inclined trend and the central pin 6B is substantially aligned to the axis of the impeller 4.

Figure 5:
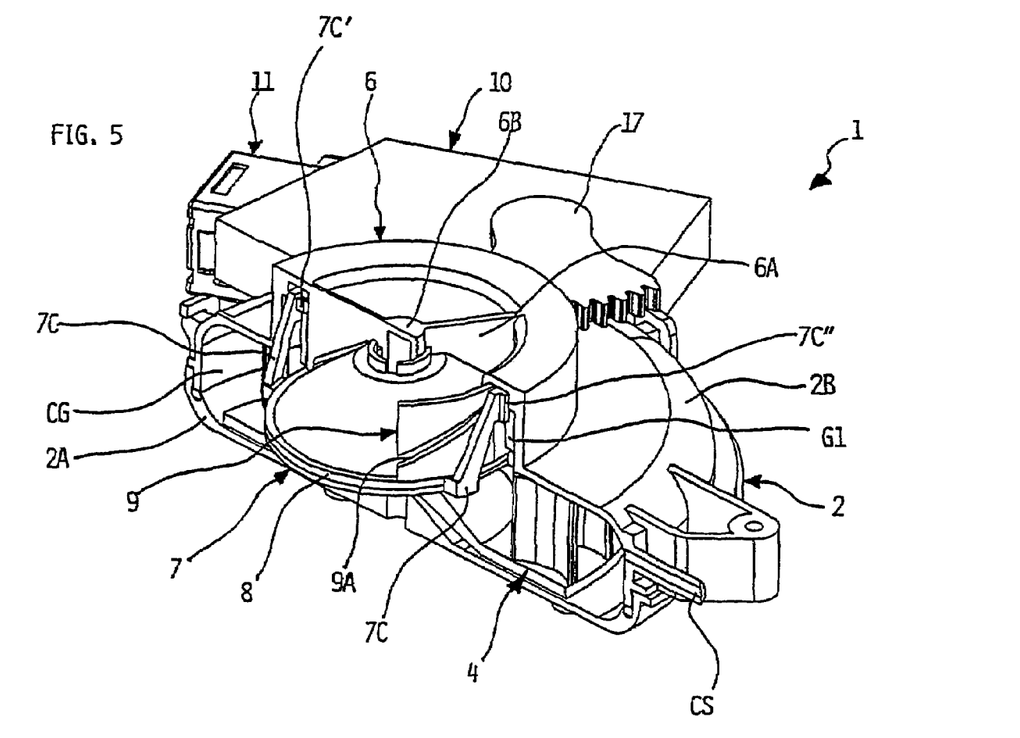
FIG. 5 shows a partial section plane view of the ventilation device of FIGS. 1 and 2.

It should be noticed how the circumferential wall of the duct 6 has an inner cavity, particularly visible in FIG. 5, for receiving further components of the device 1, to be further described, at least partially. It should also be noticed how a first side opening indicated with AL1 in FIG. 2 and a second side opening indicated with AL2 in FIG. 3 are delimited in the circumferential wall of the duct 6, whose functions will be further described.

Preferably, the volute of the ventilation device 1 can be fitted with a discharge duct communicating with the inside of the washing tub, for the condense or water rests eventually gathered inside the volute itself; such a discharge duct is indicated with CS in the FIGS. 2, 3 and 5.

In FIG. 3, reference 7 indicates the shutter of the device 1 as a whole, which has a substantially tapered shape; the shutter 7 has a hollow central path 7A and a circumferential seat 7B for receiving a ring sealing gasket indicated with 8.

Figure 4:
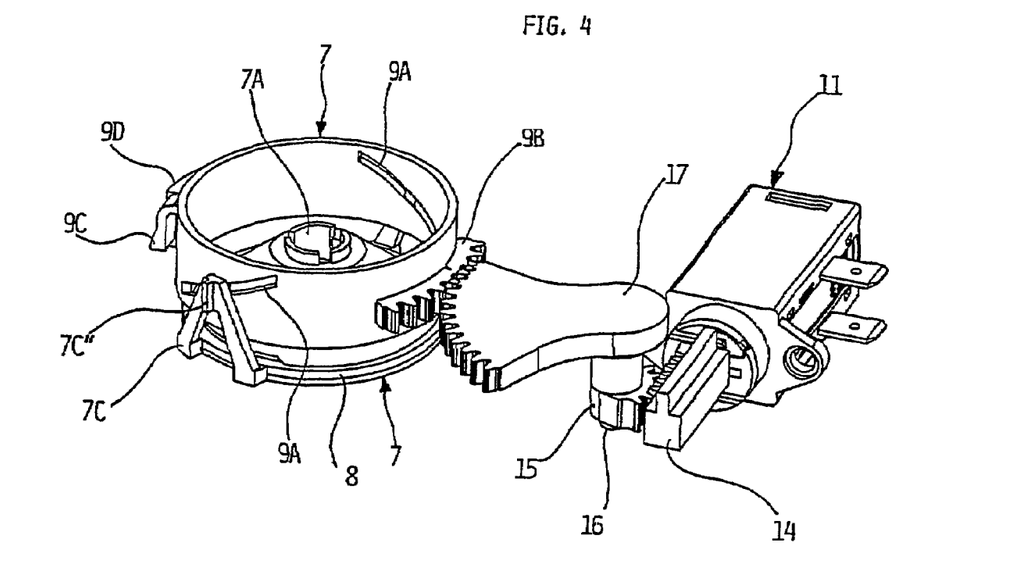
FIG. 4 shows a few components of the device of FIG. 3, cooperating between them.

Reference 7C indicates two side stirrups solidly fastened to the shutter 7, each one with a first extension 7C' facing the shutter centre, and a second extension 7C", visible also in the FIGS. 4 and 5, facing outside the shutter; also the functions of these extensions will be further described.

Always in FIG. 3, reference 9 indicates a movable ring element as a whole, to be housed at least partially in the inner cavity of the circumferential wall of the duct 6 (see FIG. 5); the body of the ring element 9 has two grooves or slits 9A, for obtaining respective cams or sloped planes, inside which the extensions 7C' of the stirrups 7C of the shutter 7 will be inserted for the purposes further described; it should be noticed how each groove 9A may be replaced by a couple of parallel relieves to delimit a guide cooperating with a relevant extension 7C'.

The outer surface of the body of the ring element 9 is also delimiting:

- a gear or gear sector indicated with 9B; as it can be noticed in FIG. 2, with the device 1 assembled, this gear 9B is positioned in line with the side opening AL1 in the duct 6;
- a hooking element 9C, whose function is to maintain the position of the ring element 9 inside the inner cavity of the circumferential wall of the duct 6;
- a relieved portion indicated with 9D, which cooperates, with the device 1 assembled and during the movement of the ring element 9, with the side opening AL2 in the duct 6, for the purposes further described.

In the figures, reference 10 indicates a housing, one-piece with the half shell 2B, for fastening an actuation device and a part of the actuation kinematic arrangement of the shutter 7.

In the example, the above actuation device consists of a thermal or thermo-electric actuator or thermo-actuator, indicated with 11, of a well known concept for the man skilled in the art, whose main structure is e.g. like the one described in WO-A-98/32141, whose teachings in this connection are considered incorporated herein for reference.

Here it is simply remembered that thermo-actuators like the one indicated with 11 comprise an outer housing, containing a body made from electric and thermal conductive material (such as metal), connected to an electric heater; in the above body a chamber is delimited containing a thermal expandable material (such as wax) and, at least partially, a thruster element being apt to cause displacement of a piston extending out of the outer housing; the electric heater typically consists of a positive temperature coefficient resistor PTC, electrically supplied by means of two terminals.

While the power terminals are live, the electric heater run by the current will generate heat and cause expansion of the thermal expandable material: this expansion will cause a linear displacement of the thruster element outside its relevant body, so as to produce motion of the piston until a determined position is reached, generally set by a mechanical stop, which can be defined as a final work position. Upon ceasing the power supply, the heater will cool down and the thermo-expandable material shrink, causing the piston and thrusting element return to their initial rest position, eventually also with the aid of an elastic recall element, such as a spring.

Therefore, thermo-actuators as above are mono-stable devices, since they allow only one work stroke and one final work position besides their normal rest position. Significant advantages of these actuators are represented by the considerable force or work power they are able to develop in spite of their small overall dimensions, low costs, low consumptions and noiseless operation.

The thermo-actuator 11, whose body is fastened to the housing 10 by restraining means, generally indicated with 12 in FIG. 1, has an actuation piston 11A with a rack element 13 solidly locked at its end, which is movable along special guides 14 delimited in the housing 10.

The rack element 13 cooperates with a gear or gear sector 15, which is solidly connected to a pin indicated with 16 in FIG. 1; on its other end, this pin 16 inserted in a through-hole of the housing 10, has a second gear or gear sector indicated with 17 in the FIGS. 2-5; as it can be particularly noticed from FIG. 2, the above second gear 17 is coupled to the gear 9B of the element 9.

Assembly of the ventilation device 1 is as follows.

To the half shell 2A is coupled to the pre-assembled motor 5, by the screws 5B, taking care that the motor actuation shaft 5A is inserted in the relevant path; now, the impeller 4 is keyed on the free end of the shaft 5A.

Then the sealing element or gasket 8 is placed in the seat 7B of the shutter and solidly fastened there (the seat 7B may have for instance small stakes to be inserted in the cavities of the gasket 8, or vice-versa; the gasket 8 may obviously be solidly fastened to the suction duct 6 and/or its edge instead of the shutter 7); the shutter 7 is then coupled to the ring element 9 inserting the extensions 7C' borne by the stirrups 7C of the shutter in its grooves 9A; it should be noticed how this operation is possible by virtue of the elasticity proper of the material of the shutter 7 and its stirrups 7C (e.g. thermoplastic material).

Now, the movable ring element 9 with the stirrups 7C coupled to it, is inserted in the cavity of the wall of the duct 6 (see FIG. 5), taking care that:
- the gear 9B of the ring element 9 is in line with the side opening AL1 of the duct 6,
- the extensions 7C" of the stirrups 7C are inserted in special guides (one of them indicated with reference G1 partially visible in FIG. 5) obtained on the inner surface of the duct 6,
- the central pin 6B inside the path of the duct 6 is inserted in the central path 7A of the shutter 7.

Now, both half shells 2A and 2B can be coupled to each other with the screws 3A and hooking means 3B, forming the outlet duct CU and chamber CG, wherein the impeller 4 is located.

The thermo-actuator 11 is fastened to the housing 10 through the special means 12, and the rack element 13, already inserted in the relevant sliding seat 14, is associated to the piston 11A of the thermo-actuator 11.

The pin 16 is inserted in the relevant through-hole provided in the housing 10, taking care, that the gear 17 on one end of the pin 16 cooperates with the gear 9B of the ring element 9; to the other end of the pin 16 is then associated the gear 15 for interacting with the rack element 13.

Now the ventilation device 1 is ready for assembly, e.g. on a dishwasher; for this application the outer edge of the duct 6 is facing or anyway communicate with the inside of the washing tub, whereas the opening AL2 of FIG. 3 will be in communication with the environment outside said tub; typically, the device 1 can be housed inside the dishwasher door, so as to have the outer edge of the duct 6 in line with an opening delimited in the inner-door of the machine (i.e. the door side usually made of stainless steel facing inside the tub) and the side opening AL2 communicating with the door inner gap; optionally, the ventilation device 1 may be housed in line with an opening on a tub side wall, being apt to interact with the duct 6 and such to have the side opening AL2 in communication with the gap between that tub wall and corresponding wall of the dishwasher cabinet (in the instance of built-in machines, usually not fitted with a special cabinet, the side opening AL2 will be directly communicating with the environment outside).

As for fastening purposes, a common ring nut may be used, which is screwed or cooperating with the end of the duct 6 protruding in the washing tub, so that a wall of that same tub or of the machine door will interlay between said ring nut and the body 2 of the device; to this purpose, the duct 6 may be fitted with a thread on the outer diameter or a bayonet hooking on the inner diameter; the above ring nut may also have a front wall like a stopper with slits and/or side labyrinth paths, for protection against direct water jets.

The outlet duct CU of the ventilation device 1 will communicate, on the contrary, with the environment outside the dishwasher and/or communicate with a suitable common condensing system (such as described in EP-A-0 721 762).

Obviously, when installing the ventilation device 1, the power terminals of the motor 5 and those of the thermo-actuator 11 will be connected to respective electric conductors through which the control system of the machine can request activation of the two actuating means 5 and 11, according to programmed modes and times.

Operation of the ventilation device 1 in the application example to a dishwasher is as follows.

During the wash steps, the device 1 is in the operating condition illustrated in the FIGS. 5 and 6, with the shutter 7 entirely obstructing the suction duct 6.

As it can be-particularly noticed in FIG. 6, in this condition, the gasket 8 carried by the shutter 7 is pressed against the lower edge of the duct 6 to prevent water, air and dampness outlet from inside of the washing tub to the outside and/or to the chamber CG; in this embodiment, the gasket 8 is sealing the duct 6 merely by virtue of an axial compression caused by the shutter 7. It should also be noticed how this position can be reached due to the sloped form of the side or lower edge of the septs 6A, so as to be coupled to the tapered form of the shutter 7.

In the above operating condition (see in particular FIG. 5):
- the extensions 7C' of the stirrups 7C are positioned at the extreme top of the relevant grooves 9A of the ring element 9,
- the extensions 7C" of these stirrups are positioned at the extreme top of the relevant guides G1.

Moreover, in this condition the side opening AL2 of the duct 6 is completely open; this in view of the ring element 9 being in an angular position, whereby its relief portion 9D does not cooperate yet with the side opening AL2.

At wash end, when the drying step should be started, the control system of the dishwasher activates power supply to the motor 5 and thermo-actuator 11.

After starting the motor 5, and consequently the impeller 4, air is sucked through the side opening AL2 in an area of the duct 6 upstream the shutter 7; in this condition, as it can be noticed, the side opening AL2 is completely open, even if the thermo-actuator 11 has been supplied simultaneously to the motor 5: with reference to the specific application, this is due to the relatively slow operating times of a thermo-actuators. Obviously, nothing will hinder the use of a different actuator for producing the movement of the shutter and/or power supply at different timing the actuators of the impeller and shutter.

The air sucked through the side opening AL2 in the above area of the duct 6 is expelled by the ventilation device 1 through the outlet duct CU.

After a certain power supply time of the actuator 11, the piston 11A of the latter will start moving and cause a corresponding linear movement of the rack element 13; as a result, also the gear 15 is moved angularly like its associated pin 16; the angular movement of the pin 16 entails the angular movement of the gear 17, which is engaged in the gear 9B carried by the ring element 9: obviously, this will also cause the angular movement of the ring element 9.

Since the extensions 7C" of the stirrups 7C of the shutter 7 are inserted in the respective guides G1, the shutter cannot move angularly, but is restrained to the linear movement alone. As a result, the angular movement of the ring element 9 will cause the extensions 7C' of the stirrups 7C to commute from the top end to the lower end of the relevant grooves 9A.

This relative movement of the grooves 9A with respect to the extensions 7C' will necessarily cause a linear translation of the relieves 7C" in their relevant guides G1, leading the shutter 7 to perform an equal linear movement (from top to bottom, with reference to the FIGS. 4-7). Therefore, the central path 7A of the shutter 7 will slide on the central pin 6B; thus, the shutter 7 goes over to the operating condition of FIG. 7, where the suction duct 6 is completely open.

It should be noticed to this purpose (FIGS. 3, 5 and 7), how the impeller 4 delimits a central space being apt to receive at least a portion of the shutter 7; as it can be particularly noticed in FIG. 7, this central space practically accepts the overall size of the shutter 7 when the latter is in a position of utmost opening of the suction duct 6. This provision along with the special form of the shutter 7 and its movement mode makes it possible to reduce the thickness of the body 2.

Therefore, as it can be seen, after the actuator 11 and its associated kinematic arrangement have been operated, the ring element 9 is capable of performing movements comprising at least an angular component, the angular movement occurring around an axis substantially perpendicular to the surface of a wall (or door) of the washing tub of the household appliance whereto the body 2 is fastened. The special actuation kinematic arrangement based on the extensions 7C', 7C" and on the guides 9A, G1, will convert the angular movements of the ring element 9 in linear movements of the shutter 7, in a direction substantially perpendicular to the surface of a wall (or door) of the washing tub of the household appliances whereto the body 2 is fastened.

According to the above description an angular motion of the ring element 9 and a linear motion of the shutter 7 are obtained simultaneously, with the following results:
- the angular movement of the ring element 9 causes the relief portion 9D of the latter to gradually obstruct the side opening AL2 of the duct 6;
- the linear movement of the shutter 7 causes the latter to gradually open the suction duct 6.

Thus, the ratio of the fresh air sucked through the side opening AL2 and the steam loaded air sucked through the duct 6 from the washing tub of the machine will vary between two extremes:
- starting the motor 5 and thermo-actuator 6 with the opening AL2 completely open and the duct 6 completely closed, fresh air only will be expelled from the outlet duct CU;
- after a set time (i.e. to let the piston 11A of the thermo-actuator 11 reach its end position), the opening AL2 will be completely obstructed by the relief portion 9D and the duct 6 completely open; only steam loaded air sucked from the washing tub of the machine will be expelled from the outlet duct CU.

Between these two extremes, the gradual change of the positions of the ring element 9 and shutter 7 will obviously cause a gradual reduction of the inlet port for the fresh air (side opening AL2) and a simultaneous gradual increase of the inlet port for the steam loaded air (duct 6).

Thus, during the initial drying step with a higher steam concentration inside the tub, steam extraction will be attenuated through its mixing with fresh air to avoid a violent steam expulsion; during a second step, when most of the steam has by now been removed from the tub, mixing with fresh air will no longer be required.

It should also be noticed, on the other hand, how in the above non limiting example the mixing ratio of the fresh air to the steam loaded air does not change in a linear or proportional mode, in consideration that the outlet section of the side opening AL2 being clearly smaller in its utmost open condition than the outlet section of the suction duct 6 in its utmost open condition.

Power supply to the motor 5 and actuator 11 will last for a set time, which is considered long enough to ensure complete steam removal from the washing tub; after this set time the control system of the machine will stop power supply to the actuators 5 and 11, so that the device 1 can go back to its starting condition illustrated in FIG. 6 (port AL2 completely open and duct 6 completely closed) performing reverse movements to the ones previously described.

According to a more sophisticated solution, inside of the tub may be fitted common air humidity sensing means (e.g. of the type used on laundry drying machines), in order to keep the drying system activated as long as air humidity is not below a preset value indicating that a satisfactory drying state of the crockery has been reached.

From the above description it is clear how the system according to the invention provides the use of a ventilation device fitted with a linear movable shutter, said device having a structure apt to comply with the restricted dimensions typical in the field, in particular of the new dishwashing machine models tending to recover as much space as possible for the crockery though respecting the typical overall dimensions of the machines.

The shutter is capable of performing movements comprising at least a linear component, which extends in the same axial direction of the fan suction duct, i.e. substantially parallel to the smallest axis of the fan body.

In view of the special motion of the shutter 7, the ventilation device 1 can be fitted with an efficient sealing system on the duct 6; according to the invention, the above linear movement actually provides for a closure resting on the sealing means consisting of the gasket 8, provided there are no frictions, so that the actuation force of the shutter 11 can be reduced compared to common solutions, as well as the risk of wear for the sealing system.

The actuation kinematic arrangement of the ventilation device has at least a component capable of performing movements comprising at least an angular component, and means for converting such movements comprising at least an angular component in the shutter movements, which comprise at least a linear component.

The peculiar taper form of the shutter 7, combined with its linear movement, also provides for a complete opening of the suction duct 6 of the ventilation device 1, differing from the common art, where the total opening provided by the disk shutters is substantially equal to half the opening obtained by the invention.

The form of the shutter 7 being substantially tapered and housed in the central section of the duct 6 and/or within the overall dimensions of the impeller 4, will also oppose a minor resistance to air circulation, differing from the procedure of the above common art.

From the above description the features and advantages of the ventilation system for household appliances, in particular washing machines, object of the present invention are clear; they are reported in the annexed claims, which form an integral part of the description herein.

Obviously many changes are possible for the man skilled in the art to the ventilation system for household appliances, in particular washing machines, described by way of example, without departing from the novelty principles of the inventive idea, and it is also clear that in practical actuation of the invention the various elements may differ in form, size, proportions and materials employed from the ones described above, and be replaced with technical equivalent elements.

Figure 8:
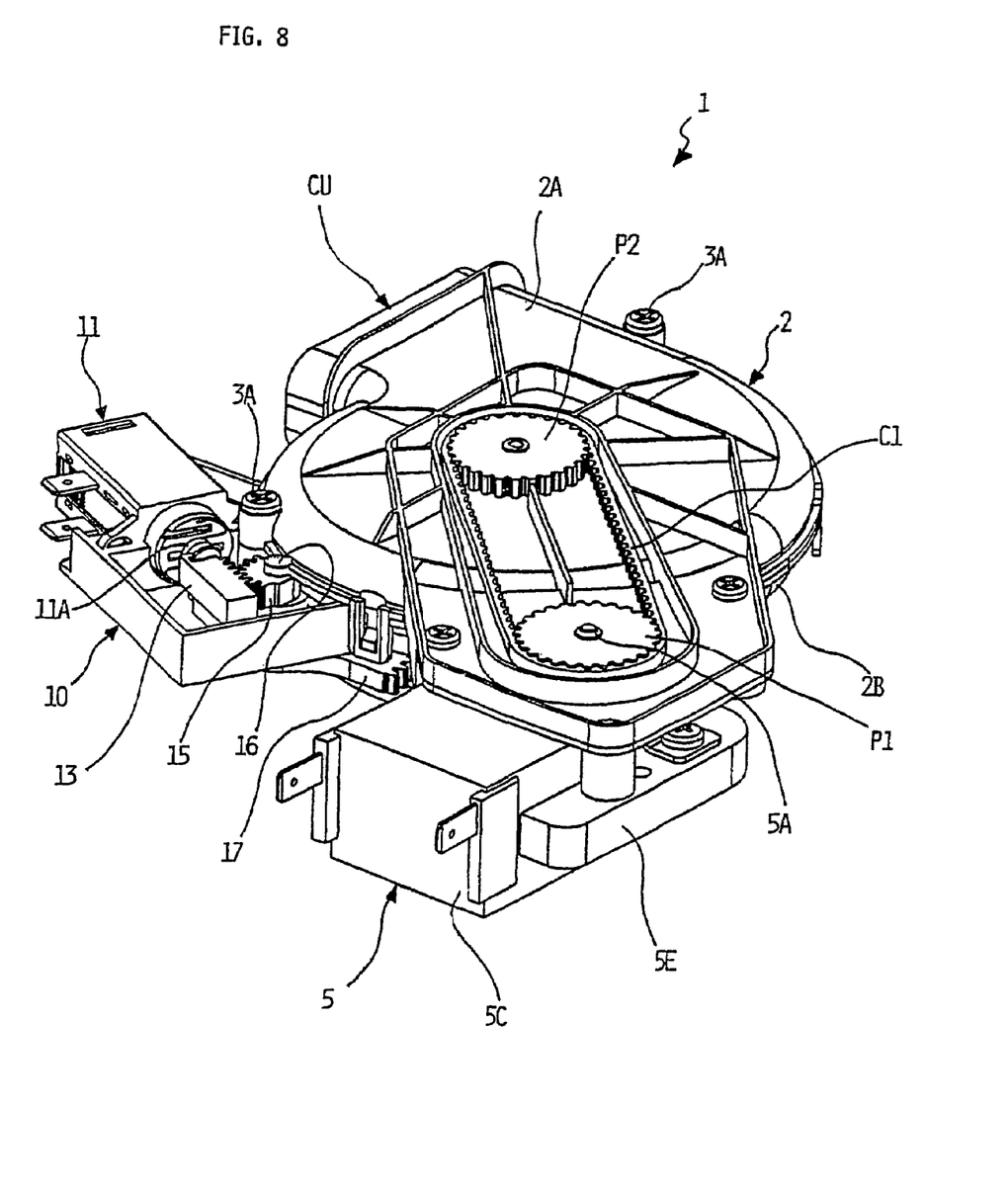
FIG. 8 shows a perspective view of a device pertaining to a ventilation system manufactured according to a first possible embodiment of the present invention.

A possible embodiment is illustrated in FIG. 8, where the same reference number of the previous figures are used for indicating technical equivalent elements.

The embodiment of FIG. 8 has the motor 5 of the ventilation device 1 located in a side position with respect to the body 2. In this instance, the shaft 5A of the motor 5 has a first pulley P1 keyed to it, whereas the impeller has an actuation shaft 4A, on which a second pulley P2 is keyed to; in this instance, motion transmission from the motor 5 to the impeller 4 is obtained through a belt C1, operating between the two pulleys P1 and P2.

The embodiment illustrated in FIG. 8 provides a ventilation device 1 with an extremely thinned profile for its easier location in the restricted spaces available in the cabinet of a dishwasher, in particular in the door of the latter.

As to further possible implementations, the movement of the shutter 7 may be obtained employing a different type of actuator, such as an electric motor with likely gear reducer instead of using a thermo-actuator; also the actuation kinematic arrangement of the shutter may be different from the one described by way of example and the same applies for the profile of the grooves 9A of the ring element 9.

In a possible embodiment of the invention, the actuating means of the shutter 7 may comprise an arrangement being apt to provide for the shutter motion and consequently an opening of the suction duct 6 and/or of the side opening AL2, at intermediate steps.

In this frame, for instance, the thermo-actuator 11 may be replaced by an actuation device as described in EP-A-0 781 920, whose teachings are incorporated herein for reference.

Figure 9:
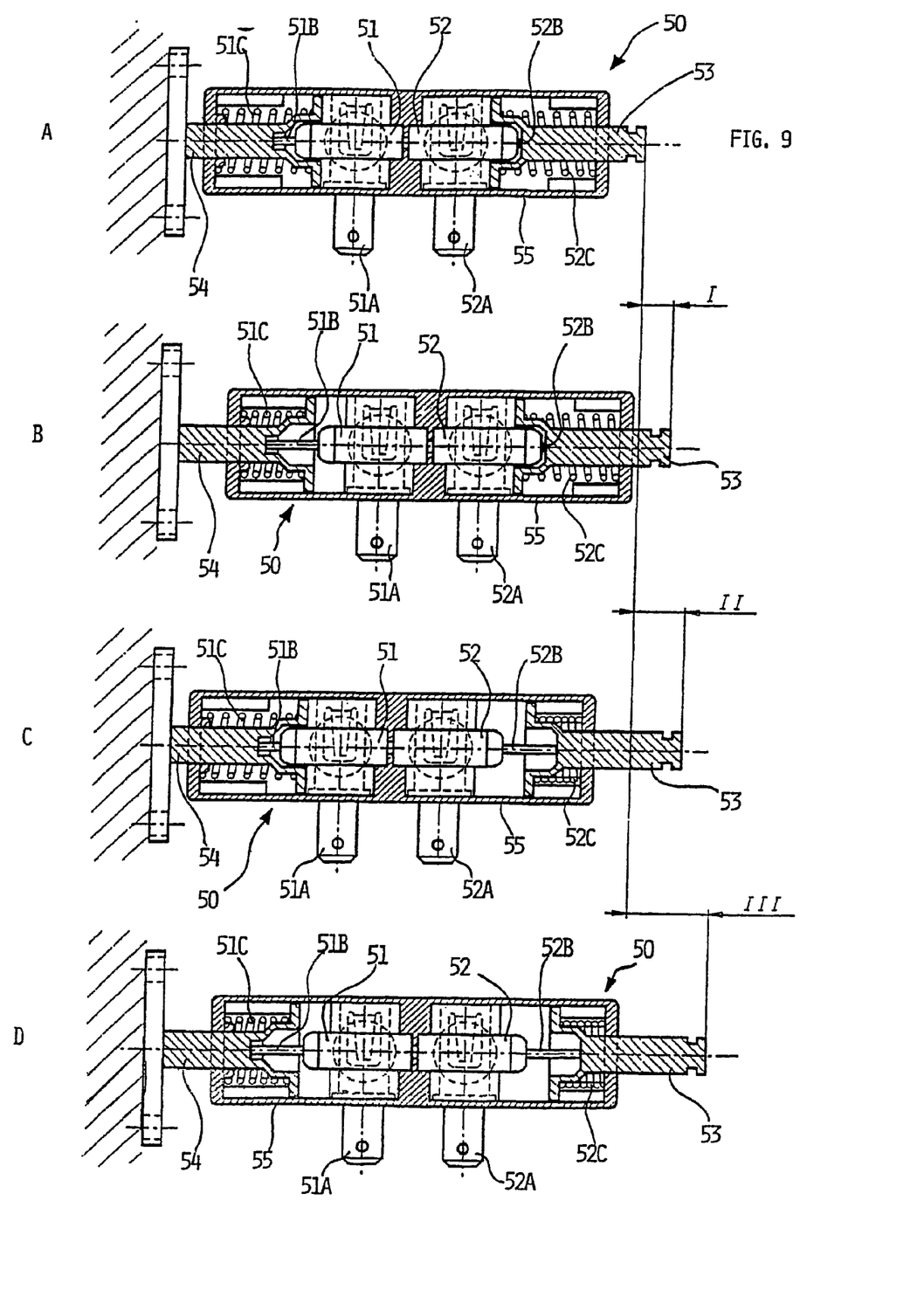
FIG. 9 shows with schematic sections an actuation device pertaining to a ventilation system manufactured according to a second possible embodiment of the present invention.

FIG. 9 illustrates schematically an implementation example of such an actuation device indicated in its whole with 50, which comprises at least a first and a second thermo-actuators 51 and 52, respectively, each one of them comprising:

a housing containing a thermal expandable material (e.g. wax), contact means, indicated with 51A and 52A, for power supply to a respective electric heater, not represented in the figure, a thruster, indicated with 51B and 52B, actuated by the thermal expandable material, being apt to perform a preset stroke.

Both thermo-actuators 51 and 52 are alike and only differ from each other for the stroke length of their relevant thrusters, in particular the stroke of the thruster 52B being longer than for the thruster 51B; by way of example, the stroke of the former is assumed to be 8 mm, whereas the second has a 4 mm stroke.

The device 50 also comprises a movable actuation element 53 and supporting means 54 with respect to a general fixed surface PP; the movable actuation element 53 can take a plurality of stable work positions depending on the power supply to the contact means 51A and/or 52A of the thermo-actuators 51 and 52.

To this purpose, the housings of the thermo-actuators 51 and 52 are solidly connected to one same body 55, which is movable with respect to the supporting means 54; the thruster 51B of the first actuator 51 operates on the movable actuation element 53, whereas the second thermo-actuator 52 operates on the supporting means 54 through its own thruster 52B.

Thus, if the contact means 51A of the first thermo-actuator 51 are powered, the relevant thruster 51B is apt to cause a first translation of the movable actuation element 53 to outside the movable body 55, contrasting the action of a spring 51C; if the contact means 52A of the second thermo-actuator 52 are powered, the relevant thruster 52B is able, on the contrary, to cause a second translation of the movable body 55, moving it away from the supporting means 54, contrasting the action of a second spring 52C. Therefore, as it can be seen from a comparison between the various parts of FIG. 9:

Section A if no power is supplied to the contact means 51A and 52A of both the thermo-actuators 51 and 52, the movable actuation element 53 is in a first position indicated with 0, with respect to the supporting means 54;

Section B if power is only supplied to the contact means 51A of the first thermo-actuator 51, the movable actuation element 53 takes a second position indicated with I, with respect to the supporting means 54;

Section C if power is only supplied to the contact means 52A of the second thermo-actuator 52, the movable actuation element 53 takes a third position indicated with II, with respect to the supporting means 54;

Section D if power is supplied to the contact means 51A and 52A of both the thermo-actuators 51 and 52, the movable actuation element 53 takes a fourth position indicated with III, with respect to the supporting means 54.

As it can be guessed, application of the actuation device 50 to the ventilation device 1 according to the invention (e.g. associating the rack element 13 of FIGS. 1 or 4 to the movable actuation device 53 of FIG. 9) provides a step-by-step motion of the shuttering means 7 and likely shuttering means 9D; for instance, the condition shown in the Section A of FIG. 9 will correspond to the position of the shutter 7 visible in FIG. 6 (suction duct 6 completely closed), whereas the condition illustrated in the Section D of FIG. 9 will correspond to the position of the shutter 7 visible in FIG. 7 (suction duct 6 completely open); the conditions illustrated in the Sections B and C of FIG. 9 will correspond to two different intermediate positions of the shutter 7 (suction duct 6 partially open).

Obviously, any actuation device being apt to obtain intermediate positions may be employed.

According to a further implementation, for obtaining the motion of the shutter 7 at intermediate steps, the thermo-actuator 11 may be replaced by an actuation device as described in EP-A-0 916 844, whose teachings are incorporated herein for reference.

Figure 10:
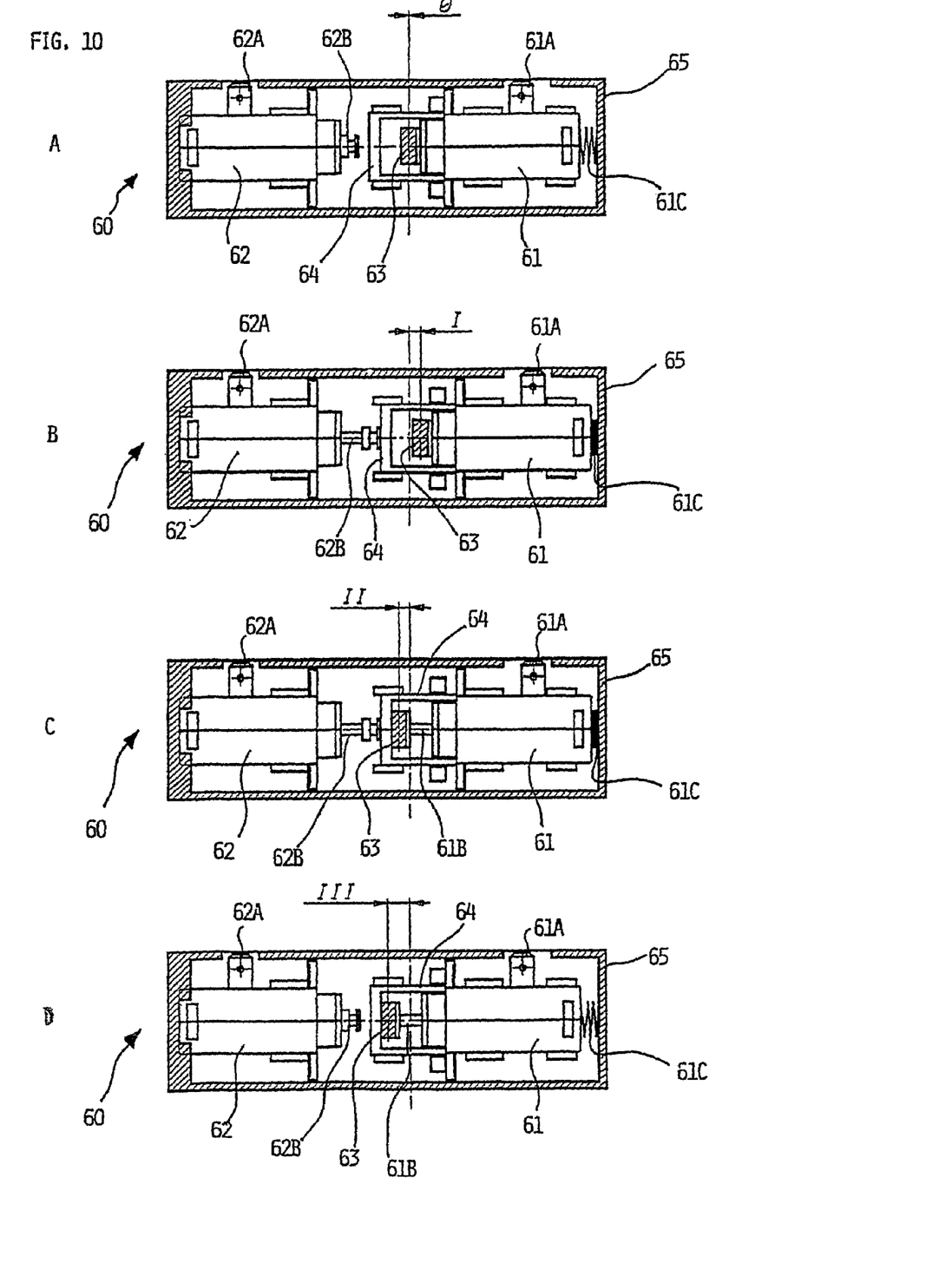
FIG. 10 shows with schematic sections an actuation device pertaining to a ventilation system manufactured according to a third possible embodiment of the present invention.

FIG. 10 illustrates schematically an implementation example of an actuation device indicated in its whole with 60, which comprises:

a first and a second thermo-actuators 61 and 62, each one fitted with a relevant electric heater, supplied through appropriate contact means 61A and 62A; each thermo-actuator comprises a relevant thruster 61B and 62B, being apt to perform a preset stroke;

at least an actuation element 63, such as a cursor, which is associated to the thruster 61B of the first thermo-actuator 61.

The first thermo-actuator 61 is free to move with respect to the second thermo-actuator 62; means are provided, such as a bridge element 64, for transferring the thrust produced by the second thermo-actuator 62 to the first thermo-actuator 61, causing a change to the relevant arrangement of each other.

To this purpose, the first thermo-actuator 61 is assembled floating, i.e. sliding linearly with respect to the second thermo-actuator 62 within a body 65 of the actuation device 60, contrasting the action of a spring 61C.

The actuation element 63 is capable of taking at least three different stable work positions, depending on the power supply to the first or second or both thermo-actuators 61 and 62. In particular, as it can be seen from a comparison between the various parts of FIG. 10:

Section A if no power is supplied to the contact means 61A and 62A of both thermo-actuators 61 and 62, the actuation element 53 is in a first position indicated with 0;

Section B if power is only supplied to the second thermo-actuator 62, the relevant thruster 62B is apt to cause a displacement of the position of the first thermo-actuator 61 through the bridge element 64, and consequently a first translation of the actuation element 63 in a first direction, bringing it to a second position indicated with I;

Section C if power is supplied to both thermo-actuators 61 and 62, the first thermo-actuator 61 is displaced with respect to its normal position through the action of the first thermo-actuator 62; in this condition, the thruster 61A of the first thermo-actuator will cause a second translation of the actuation element 63 to a second position opposite to said first direction, bringing it to a third position indicated with II;

Section D if power is only supplied to the first thermo-actuator 61, the latter is in its normal original position (i.e. it is not displaced by the action of the thermo-actuator 62); the thruster 61A will cause a third translation in said second direction of the actuation element 63, bringing it to a fourth position indicated with III.

Therefore, also in this case, the application of the actuation device 60 to the ventilation device 1 according to the invention (e.g. associating the rack element 13 of FIGS. 1 or 4 to the actuation element 63 of FIG. 10) ensures a step-by-step motion of the shuttering means 7, and likely shuttering means 9D.

Other implementations may provide the central pin 6B of the suction duct 6 with a through-cavity, to ensure anyway a certain air suction degree from inside the washing tub of the machine also when the shutter 7 is in its closed position of the duct 6.

In this event, operation of the ventilation device 1 may for instance provide a first suction step with the thermo-actuator 11 not powered, during which only a portion of air is sucked from the central hole of the hollow pin 6B, with a preset section depending on the initial high humidity rate in the washing tub of the machine.

Another possible implementation, not represented, may provide a helical spring operating in compression in order to react the shutter 7.

This spring may for instance be fitted over the portion of the central pin 6B protruding under the taper portion of the shutter 7; the free end of the central pin 6B would have a suitable restraining element for the above spring, eventually consisting of a washer or riveted end of the pin 6B.

Obviously, instead of a helical spring operating in compression, the elastic element for reacting the shutter 7 may consist of a foil spring or spiral spring, or still a traction operated spring; obviously, the same spring could be placed in another location, if necessary.

In the example represented in the figures, the ventilation device 1 object of the invention has a shutter moving in one linear direction only; however, in main line, nothing will hinder the man skilled in the art to provide a shutter capable of performing composite or combined movements, i.e. having at least a linear movement component and at least an angular movement component, e.g. a screw movement.

In such an implementation, for instance, the ring element 9 may be omitted, the central pin 6B have a kind of threading coupled to a nut screw obtained in the path 7A of the shutter 7, and the shutter have a gear cooperating with the gear 17.

It should be noticed that also in the event of a shutter capable of composite movement (linear/angular), the invention would anyway be advantageous compared to the common technique, in terms of fluid mechanics efficiency, total opening capacity of the duct, less actuation force and frictions (frictions would actually only occur in a short step of the shutter motion, differing from the situation related to disk shutters of the common art).

A further embodiment may have the system so conceived to have the shutter 7 not completely obstructing the duct 6 also with the thermo-actuator 11 not power supplied; this in order to always have a minimum suction outlet from the tub in the starting conditions of high humidity inside the tub, said humidity being then mixed with a high rate of dry air drawn in through the side opening AL2; the shutter 7 may then be gradually opened at a subsequent step, with a simultaneous closure of the side opening AL2.

Therefore, according to this embodiment, the motor 5 would be actuated in advance with respect to the thermo-actuator 11 and the end of the duct 6 facing inside the washing tub protected by a commonly known suitable screening with labyrinth paths being apt to let air flow through and prevent water spraying from the washing to enter the tub.

Another embodiment, instead of the two stirrups 7C, the shutter 7 may provide an outer ring also operating as a shutter for the side opening AL2; in this instance, the latter would be opened/closed by an axial or combined movement instead of a simple angular movement, as in the embodiment described with reference to the annexed figures; this embodiment does not require the ring element and the actuation system of the shutter 7 would differ from the one described above.

The ventilation device 1 may also be conceived to permit only a partial obstruction of the side opening AL2 by the relief 9D of the ring element 9; if necessary, the same ring element 9 may omit the relief 9D and have the side opening AL2 always completely open.

The invention claimed is:

1. A ventilation system for household appliances comprising a device having
    an impeller with an axis of rotation,
    a housing chamber for said impeller,
    a suction duct, through which a first gaseous fluid is sucked into said chamber by means of said impeller,
    an ejection duct, through which the first fluid sucked into said chamber is expelled by means of said impeller,
    first movable shutter means, and
    actuating means, for producing the motion of said first shutter means,
    wherein said first shutter means has an axis coaxial with said axis of rotation of said impeller, one of said ducts has an axis coaxial with said axis of said first shutter means, said first shutter means is disposed between said impeller and said one of said ducts, and said first shutter means is reciprocally translatable between said impeller and said one of said ducts along said axes of rotation of said impeller and of said one of said ducts for opening and closing said one of said ducts.

2. A system according to claim 1, wherein the longitudinal axis of said suction duct is substantially parallel to the axis of rotation of said impeller.

3. A system according to claim 1 wherein said first shutter means is movable at least partially in said chamber.

4. A system according to claim 1 wherein said first shutter means is movable only in said direction substantially axial to the axis of rotation of said impeller and/or to the axis of said suction duct.

5. A system according to claim 1 wherein said first shutter means are capable of performing angular movements in respect of the axis of rotation of said impeller and/or the axis of said duct.

6. A system according to claim 1 adapted to be housed in a household appliance comprising a washing tub delimited by walls and a door, said first shutter means being movable in a direction substantially perpendicular to the surface of said wall or door of said washing tub of said household appliance.

7. A system according to claim 1 wherein said first shutter means allow the opening of the entire through-section of said suction duct.

8. A system according to claim 1 wherein said device comprises one sole body, delimiting said suction duct and said ejection duct.

9. A system according to claim 1, wherein said suction duct has a terminal edge facing directly in said chamber, said first shutter means cooperating with said edge alone for obstructing said suction duct.

10. A system according to claim 1, wherein said first shutter means have at least a substantially tapered portion facing toward the inlet of said suction duct.

11. A system according to claim 1, wherein said impeller has a central space able to receive at least a portion of said first shutter means.

12. A system according to claim 1, wherein said first shutter means has a portion inserted in the dimensions of said impeller.

13. A system according to claim 1 comprising sealing means operating between said first shutter means and said suction duct and/or said edge, said sealing means being solidly connected to said first shutter means or said suction duct and/or said edge.

14. A system according to claim 12 wherein said sealing means are arranged, in co-operation with said first shutter means, in such a way as to create a seal only after an axial compression performed by said first shutter means.

15. A system according to claim 1, wherein said actuating means comprise an actuator and a mechanical kinematic arrangement.

16. A system according to the claim 15, wherein said suction duct has an inner cavity, wherein components of said kinematic arrangement are at least partially housed.

17. A system according to claim 1 wherein said kinematic arrangement is adapted to convert an angular movement of at least a first component into a linear movement of said first shutter means.

18. A system according to claim 17 wherein adapted to be housed in a household appliance, said household appliance comprising at least a washing tub delimited by walls and a door, said first component being restrained to perform angular movements only, said angular movements occurring around an axis substantially perpendicular to the surface of said wall or door of said washing tub of said household appliance.

19. A system according to claim 15 wherein said kinematic arrangement comprises a cam.

20. A system according to claim 17 wherein said first component comprises one or more first guides for obtaining cams or sloped planes, wherein first extensions of said first shutter means are engaged.

21. A system according to claim 1 wherein in said body and/or in said suction duct are delimited one or more second guides, wherein second extensions of said first shutter means are engaged.

22. A system according to claim 17 wherein the angular movement of said first component causes a sliding of said first guides with respect to said first extensions and consequently a linear sliding of said second extension in said second guides.

23. A system according to claim 15, wherein said kinematic arrangement comprises a plurality of gears or gear sectors.

24. A system according to claim 15 wherein said kinematic arrangement comprises at least a gear or gear sector associated to said first component.

25. A system according to claim 15, wherein said kinematic arrangement comprises at least a rack.

26. A system according to claim 15, wherein said kinematic arrangement is adapted to convert a first linear actuation of said actuator into a second linear actuation of said first shutter means, with interposed angular actuation.

27. A system according to claim 1 comprising means for mixing a second fluid with said first fluid.

28. A system according to claim 27 wherein said mixing means comprise a side opening of said suction duct.

29. A system according to claim 28 wherein said mixing means comprise a second movable shutter means operating on said side opening, said second shutter means being movable for changing the through-section for said second fluid in said side opening.

30. A system according to claim 29 comprising means for simultaneous actuation of said first shutter means and said second shutter means.

31. A system according to claim 29 wherein the motion of said second shutter means is produced by the actuation of said actuating means.

32. A system according to claim 29, wherein said second shutter means are obtained at least partially by means of said first component through a relief of the latter.

33. A system according to claim 29, wherein said second shutter means is capable of changing its own operating position from at least a first position, with said side opening completely open, to a second position, with said side opening completely closed.

34. A system according to claim 33 wherein:
in the first position of said second shutter means, said first shutter means is in an utmost closure condition of said suction duct,
in the second position of said second shutter means, said first shutter means is in a minimum closure condition of said suction duct.

35. A system according to claim 27, comprising adjusting means for changing the ratio between said second fluid and said first fluid.

36. A system according to claim 35 wherein said adjusting means operate for a non linear or non proportional change of the ratio between said second fluid and said first fluid.

37. A system according to claim 35 wherein said adjusting means comprise said first component.

38. A system according to claim 1 wherein said actuating means are of a type apt to move in a linear direction.

39. A system according to claim 1 wherein said actuating means comprise a thermal or thermal-electric actuator.

40. A system according to claim 1 wherein said actuating means and/or said kinematic arrangement is adapted to move said first actuating means in steps.

41. A system according to claim 40 wherein said actuating means comprise an actuation device having a pair of thermo-actuators.

42. A system according to claim 41 wherein said actuation device comprises an actuation element capable of occupying three different stable work positions, depending on whether the first, second or both of said thermo-actuators are power supplied.

43. A system according to claim 1 comprising a second actuator for actuating said impeller.

44. A system according to claim 43 wherein said second actuator comprises an electric motor, which has an actuation shaft substantially coaxial to the axis of rotation of said impeller.

45. A system according to claim 43, wherein said second actuator comprises an electric motor, having an actuation shaft out-of-alignment with the axis of rotation of said impeller, and transmission means for transferring the motion from said actuation shaft to said impeller, said transmission means comprising a pair of pulleys and a belt.

* * * * *